J. SHERRILL.
Weed-Turner.
No. 218,071.   Patented July 29, 1879.
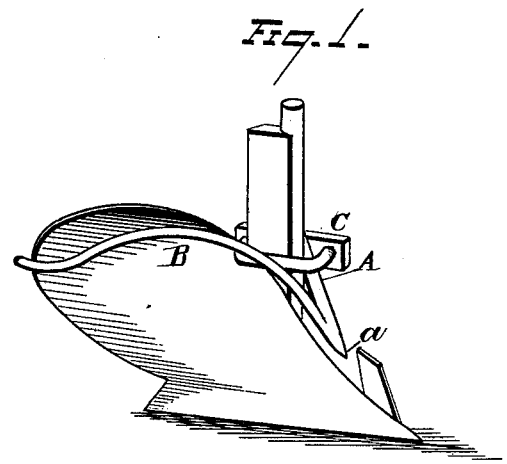
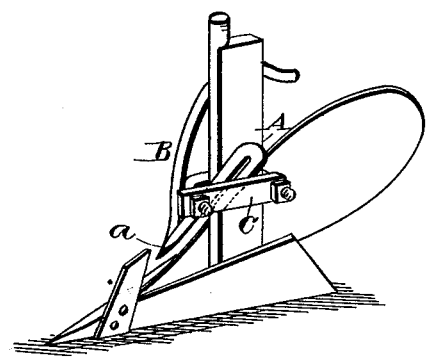

UNITED STATES PATENT OFFICE.

JAMES SHERRILL, OF HARRISBURG, OREGON.

IMPROVEMENT IN WEED-TURNERS.

Specification forming part of Letters Patent No. 218,071, dated July 29, 1879; application filed January 8, 1879.

*To all whom it may concern:*

Be it known that I, JAMES SHERRILL, of Harrisburg, in the county of Linn and State of Oregon, have invented certain new and useful Improvements in Weed-Turners; and I do hereby declare the following to be a full, clear, and exact description of the invention, such as will enable others skilled in the art to which it pertains to make and use it, reference being had to the accompanying drawings, which form part of this specification.

My invention relates to weed-turners, and is designed to provide an improved device which may be secured to the standard of a plow in vertical adjustment thereon, and operate in an effective manner in keeping stubble and other clogging matter from interfering with the working of the plow.

The invention consists in the combination of a straight shank and a curved guard, which form by their union an unbroken working-point, said stem extending rearward and upward in a straight line, and clamped to the standard, while said guard extends diagonally outward from the stem, and curves first upwardly and then downwardly above the mold-board.

Heretofore a weed-turner has been made having a stem which is clamped to a plow-beam in vertical adjustment, and having a guard which curves up over the mold-board, the forward extremity of the device being provided with an upwardly and horizontally curved spur or projection, while in the rear of the latter the guard curves laterally in front of the stem.

The improvement accomplished by my invention is, that by the union of my guard and stem there is not the liability for the working-point to catch weeds and other objectionable matter, so as to clog the operation of the device. The stubble and similar foreign matter are readily thrown off from the mold-board, and there is no tendency to accumulate a quantity of the same in front of the plow.

It will be understood that in setting forth the advantage attained by clamping my weed-turner to the standard I bear in mind the fact that it is not new to attach colters to the standard instead of to the plow-beam, for the purpose of obviating necessity of moving the same when the plow-beam is shifted for the draft of different horse-power.

In the drawings, Figure 1 is a view, in perspective, of my invention applied to the standard of any suitable plow. Fig. 2 is a view, in elevation, of the side not fully shown in the preceding view.

The weed-turner is composed of the stem A and the guard B, which unite to form the unbroken working-point $a$. From this point said stem extends rearward and upward in straight line, and is secured in vertical adjustment upon the plow-standard by means of any suitable clamp, C. Said guard B branches off in a diagonal manner from the stem, and extends rearward over the mold-board in a curve, which projects first upwardly and finally downwardly.

It will be observed that the unbroken working-point of the device permits it to turn off the weeds and other foreign matter from the plow, and none of the same would be liable to cling to said working-point or to clog it in its operation. It is also apparent that by securing the device to the standard of the plow no adjustment of the same would be necessary in case the plow-beam is shifted to adapt it to the working of a different number of horses.

Having fully described my invention, what I claim as new, and desire to secure by Letters Patent, is—

The combination of the stem A and the curved guard B with the clamp C, which secures the stem in vertical adjustment upon the plow-standard, said stem and guard forming by their union the described unbroken working-point $a$, substantially as set forth.

In testimony that I claim the foregoing I have hereunto set my hand this 19th day of December, 1878.

JAMES SHERRILL.

Witnesses:
G. W. BRANDENBURG,
JAMES RILEY.